United States Patent
Little et al.

(10) Patent No.: US 9,845,539 B2
(45) Date of Patent: Dec. 19, 2017

(54) TREATMENT OF HYDROGEN SULFIDE

(71) Applicant: SULFURCYCLE INTELLECTUAL PROPERTY HOLDING COMPANY LLC, Broomfield, CO (US)

(72) Inventors: C. Deane Little, Niwot, CO (US); Joseph Victor Kosmoski, Longmont, CO (US); Yongan Yang, Lakewood, CO (US); Ryan Patrick O'Hayre, Golden, CO (US); Tim S. Olson, Arvada, CO (US)

( * ) Notice: Subject to any disclaimer, the term of this patent is extended or adjusted under 35 U.S.C. 154(b) by 0 days.

(21) Appl. No.: 14/649,134

(22) PCT Filed: Dec. 20, 2013

(86) PCT No.: PCT/US2013/077251
§ 371 (c)(1),
(2) Date: Jun. 2, 2015

(87) PCT Pub. No.: WO2014/100731
PCT Pub. Date: Jun. 26, 2014

(65) Prior Publication Data
US 2015/0322580 A1 Nov. 12, 2015

Related U.S. Application Data

(60) Provisional application No. 61/745,355, filed on Dec. 21, 2012.

(51) Int. Cl.
*C25B 1/00* (2006.01)
*C25B 1/16* (2006.01)
(Continued)

(52) U.S. Cl.
CPC ............ *C25B 1/16* (2013.01); *B01D 53/1425* (2013.01); *B01D 53/1468* (2013.01);
(Continued)

(58) Field of Classification Search
CPC .. C25B 15/08; C25B 1/16; C25B 1/00; B01D 53/52; B01D 5/31468; B01D 53/73; B01D 2257/304; B01D 2257/504
See application file for complete search history.

(56) References Cited

U.S. PATENT DOCUMENTS

| 2,252,867 A | 8/1941 | Sconce et al. |
| 3,249,522 A | 5/1966 | Bolmer |

(Continued)

FOREIGN PATENT DOCUMENTS

WO  2005121279 A1  12/2005

OTHER PUBLICATIONS

Austrailian Examination Report in Application 2013364034, dated Jul. 3, 2017, 5 pages.
(Continued)

*Primary Examiner* — Arun S Phasge

(57) ABSTRACT

A chemical process captures and convert hydrogen sulfide ($H_2S$) gas into elemental sulfur, polysulfide, sulfur dioxide and/or sulfuric acid while regenerating sodium hydroxide capture agent for further use in an initial $H_2S$ capture step. Processing may include initial sodium hydroxide scrubbing of gas streams containing $H_2S$, electrochemical regeneration of the sodium hydroxide from sodium hydrosulfide or sodium sulfide, recovery of sulfur and/or sulfur dioxide from the electrochemical processing, and production of sulfuric acid from such sulfur and/or sulfur dioxide.

38 Claims, 1 Drawing Sheet

(51) Int. Cl.
    B01D 53/52    (2006.01)
    B01D 53/78    (2006.01)
    B01D 53/14    (2006.01)
    B01D 53/73    (2006.01)
    C25B 15/08    (2006.01)

(52) U.S. Cl.
    CPC ......... B01D 53/1493 (2013.01); B01D 53/52 (2013.01); B01D 53/73 (2013.01); B01D 53/78 (2013.01); C25B 1/00 (2013.01); C25B 15/08 (2013.01); B01D 2251/304 (2013.01); B01D 2252/10 (2013.01); B01D 2257/304 (2013.01)

(56) References Cited

U.S. PATENT DOCUMENTS

| | | | |
|---|---|---|---|
| 3,409,520 A * | 11/1968 | Bolmer | C01B 3/00 205/462 |
| 3,801,698 A * | 4/1974 | Lowrance et al. | B01D 53/526 205/510 |
| 4,001,385 A | 1/1977 | Sanders | |
| 4,038,366 A | 7/1977 | Fukuda et al. | |
| 4,041,129 A | 8/1977 | Foster et al. | |
| 4,162,187 A | 7/1979 | Smith et al. | |
| 4,190,508 A | 2/1980 | Kametani et al. | |
| 4,246,079 A | 1/1981 | Goodrich et al. | |
| 4,772,366 A | 9/1988 | Winnick | |
| 5,019,227 A | 5/1991 | White et al. | |
| 5,082,526 A | 1/1992 | Dorris | |
| 5,578,189 A | 11/1996 | Joshi et al. | |
| 5,908,545 A | 6/1999 | Donini et al. | |
| 2009/0035199 A1 * | 2/2009 | Mortson | B01D 53/526 423/224 |
| 2009/0134040 A1 | 5/2009 | Gordon et al. | |
| 2010/0187124 A1 * | 7/2010 | Koveal | C10G 19/02 205/347 |
| 2012/0055808 A1 | 3/2012 | Martin et al. | |
| 2012/0094337 A1 | 4/2012 | Van Den Born et al. | |

OTHER PUBLICATIONS

PCT International Search Report and Written Opinion in PCT/US2013/077251, dated Apr. 15, 2014, 11 pages.
PCT International Preliminary Report on Patentability in PCT/US2013/077251, dated Jun. 23, 2015, 8 pages.

* cited by examiner

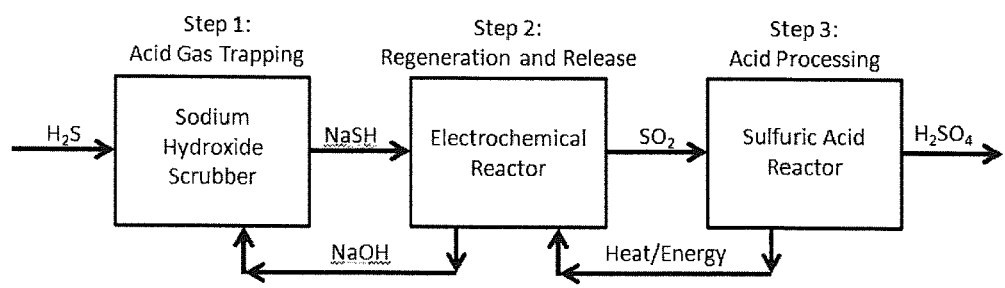

TREATMENT OF HYDROGEN SULFIDE

CROSS-REFERENCE TO RELATED APPLICATIONS

This applications claims the benefit of U.S. provisional patent application No. 61/735,355 filed Dec. 21, 2012, the entire contents of which are incorporated by reference herein for all purposes.

FIELD OF THE INVENTION

The invention relates to treatment of hydrogen sulfide, including in some aspects the capture of hydrogen sulfide using alkali metal scrubbing reagent and processing to prepare sulfur-containing products and to regenerate scrubbing reagent for additional capture of hydrogen sulfide.

BACKGROUND OF THE INVENTION

Hydrogen sulfide ($H_2S$) is a highly toxic and corrosive gas that is a common contaminant of raw natural gas, groundwater and petroleum refinery operations. Many strategies have been developed to remove hydrogen sulfide from natural gas and sour gas streams generated in the oil and gas industry. Sodium hydroxide (NaOH) is an effective scrubbing agent for hydrogen sulfide removal from mixed gas streams, with a strongly favorable equilibrium constant and rapid kinetics. However, due to high cost of single use capture and the lack of a feasible regeneration process, NaOH is generally not considered to be economically viable for large scale scrubbing.

In the oil and gas industry, amine scrubbers are typically used to remove $H_2S$ from mixed gas streams. During subsequent scrubber regeneration, this $H_2S$ is then released from the amine scrubbing solution as a concentrated gas stream and further processed into sulfur by the Claus process. As an alternative to amine scrubber technology, aqueous sodium hydroxide solutions can be used to capture $H_2S$ from mixed gas streams, via the spontaneous reaction of $H_2S_{(g)}$ with $NaOH_{(aq)}$ to form $Na_2S_{(aq)}$ or $NaHS_{(aq)}$. A significant economic challenge in using sodium hydroxide to scrub hydrogen sulfide gas is the lack of a reliable, low cost method to regenerate the hydroxide capture reagent (i.e. to convert the $Na_2S_{(aq)}$ or $NaHS_{(aq)}$ back into $NaOH_{(aq)}$. The amount of hydrogen sulfide processed annually far exceeds the market need for the sodium sulfide byproducts and therefore results in a linear process stream that generates significant unstable and potentially toxic chemical wastes. Furthermore, conventional production of sodium hydroxide via the chloralkali process is both costly and environmentally challenging due to co-production of toxic chlorine gas and substantial carbon dioxide emissions.

SUMMARY OF THE INVENTION

The innovative processing described here may be used in a closed-loop, or nearly closed-loop, capture/regeneration process using alkali metal base as the capture agent, followed by direct regeneration of the alkali metal base from the alkali metal sulfide or alkali metal hydrosulfide wastestream using a combined electrochemical salt-splitting and oxidation process. Such processing may reduce the cost and energy demand of $H_2S$ scrubbing from raw natural gas and sour gas streams. An additional benefit may be the generation of sulfur-containing products, such as elemental sulfur, polysulfides, thiosulfate, sulfite, sulfate and/or sulfur dioxide, and possible further processing of one or more such products to produce sulfuric acid. The description below is presented with reference primarily to sodium as the alkali metal, but the disclosure applies equally to use of other alkali metal, such as potassium, with replacement of references in the disclosure with references to the other alkali metal.

Sodium hydroxide rapidly and efficiently captures hydrogen sulfide gas from mixed gas streams via standard wet scrubber technology. The primary products of the chemical trapping reaction may be first sodium sulfide ($Na_2S$) followed by sodium hydrogen sulfide (NaHS) (also known as sodium hydrosulfide or sodium bisulfide). Both NaOH and $Na_2S$ can serve as alkali metal bases capable of capturing acid gases such as $H_2S$. Although NaHS and $Na_2S$ have minimal demand in current markets, the inventors have identified use of those materials in a low voltage, energy efficient electrochemical processing to regenerate sodium hydroxide, which may be used to scrub additional hydrogen sulfide. The standard-state theoretical voltage (0.43 V) required for this electrochemical processing is 80% lower than the standard-state theoretical voltage (2.3 V) required to generate sodium hydroxide using standard industrial techniques, such as the chloralkali process. The electrochemical processing may produce sulfur-containing product, for example elemental sulfur, polysulfides, and/or sulfur dioxide, which may be particularly useful in the production of sulfuric acid. Unlike $Na_2S$ and NaHS, sulfuric acid is a valuable chemical and is currently the world's leading chemical commodity by sales volume.

The invention may implement a novel electrochemical-chemical strategy as part of processing to scrub hydrogen sulfide gas from mixed gas streams, regenerate the sodium hydroxide capture agent and produce one or more of elemental sulfur, polysulfides, thiosulfate, sulfite, sulfate, sulfur dioxide and/or concentrated sulfuric acid.

A first aspect of the invention involves a method for processing hydrogen sulfide and preparing sulfur-containing products including a scrubbing step followed by an electrochemical processing step. The method includes scrubbing hydrogen sulfide from a gas stream that includes hydrogen sulfide as at least one component of the gas stream. During the scrubbing, the gas stream is contacted with basic alkali metal scrubbing reagent to form alkali metal-containing sulfide. An electrolyte solution feed comprising at least a portion of the alkali metal-containing sulfide is subjected to electrochemical processing to produce sulfur-containing product. The electrochemical processing includes feeding at least a portion of the electrolyte solution feed to an electrochemical reactor including an anode region and a cathode region, producing the sulfur-containing product in the anode region, and producing alkali metal hydroxide in the cathode region.

A second aspect of the invention involves a method for processing hydrogen sulfide, and which includes preparing sulfuric acid. The method includes scrubbing hydrogen sulfide from a gas stream that includes hydrogen sulfide as at least one component of the gas stream. During the scrubbing, the gas stream is contacted with basic alkali metal scrubbing reagent to form alkali metal-containing sulfide. The method also includes electrochemical processing an electrolyte solution feed comprising at least a portion of the alkali metal-containing sulfide to produce sulfur-containing product. The method includes preparing sulfuric acid containing sulfur from sulfur-containing feed that comprises at least a portion of the sulfur-containing product from the electrochemical processing.

A third aspect of the invention involves a method for making sulfuric acid. The method includes electrochemical processing an electrolyte solution feed comprising alkali metal-containing sulfide to produce sulfur oxide gas, recovering sulfur dioxide gas product from the electrochemical processing, and preparing sulfuric acid containing sulfur from sulfur-containing feed comprising at least a portion of the sulfur dioxide gas product.

A number of feature refinements and additional features are applicable to these and other aspects of the invention. These feature refinements and additional features may be used individually or in any combination. As such each of the following features may be, but are not required to be, used with any other feature or combination of any of the aspects of the invention.

The scrubbing and electrochemical processing steps of the second aspect may be according to the first aspect, or may be different from the first aspect. The electrochemical processing of the third aspect may be the same as or different than the electrochemical processing of either of the first or second aspects. The basic alkali metal scrubbing reagent may be referred to as simply the scrubbing reagent. During the scrubbing, the gas stream may be contacted with the scrubbing reagent by adding the gas stream to the scrubbing reagent or adding the scrubbing agent to the gas stream. The alkali metal scrubbing reagent includes an alkali metal, such as in the form of an alkali metal cation in solution in a scrubbing solution containing the scrubbing reagent. The scrubbing reagent may react with hydrogen sulfide to capture hydrogen sulfide from the gas stream. The scrubbing reagent may include an alkali metal base that acts as an agent to capture hydrogen sulfide. The scrubbing reagent may be in the form of an aqueous solution containing dissolved alkali metal base. Alkali metal base used as a capture agent for capturing hydrogen sulfide may include for example alkali metal hydroxide and/or alkali metal sulfide. For example, a scrubbing reagent aqueous solution may include sodium sulfide and/or sodium hydroxide that reacts to capture hydrogen sulfide in the form of sodium hydrosulfide. The first aspect of the invention may include, after the electrochemical processing, preparing sulfuric acid containing sulfur from sulfur-containing feed comprising at least a portion of sulfur-containing product from the electrochemical processing of the first aspect of the invention.

Sulfur-containing product produced in the electrochemical processing may include one or more of the following: sulfur oxide (for example sulfur dioxide and/or sulfur trioxide), thiosulfate, sulfite, sulfate, elemental sulfur and various polysulfides. The sulfur-containing product may include sulfur-containing precipitate, such as including elemental sulfur and/or polysulfide precipitate. The sulfur-containing product may include sulfur-containing gas, such as including gaseous sulfur dioxide and/or sulfur trioxide. The sulfur-containing product may include dissolved sulfur-containing material, such as dissolved polysulfide, thiosulfate, sulfite or and/or sulfate. The electrochemical processing may include collecting sulfur oxide gas, which may include sulfur dioxide and/or sulfur trioxide, all or some of which may be used in sulfur-containing feed for preparing sulfuric acid. As used herein, reference simply to sulfur as a sulfur-containing product includes sulfur in elemental form and in the form of polysulfides. Elemental sulfur may be in the form of a cyclic molecule ($S_8$). Sulfur as a sulfur-containing product may be in the form of a precipitate that forms during the electrochemical processing or may be in the form of soluble polysulfide. One advantage of sulfur dioxide or sulfur trioxide is that it may be collected from the electrochemical processing as a gas, which separates easily from the reaction mixture and may be conveniently collected and piped to sulfuric acid manufacture or other operations. In contrast, sulfur precipitate is more difficult to separate from the reactive mixture and to transport for subsequent processing. The sulfur-containing product may include a sulfur-containing material other than or in addition to sulfur or sulfur dioxide.

During the electrochemical processing, at least a portion of the electrolyte solution feed may be fed to an electrochemical reactor including an anode region and a cathode region. The electrochemical reactor may include at least one electrochemical cell comprising an anode, a cathode, an anode region adjacent the anode and a cathode region adjacent the cathode. The electrochemical reactor may include multiple such electrochemical cells. Some or all such electrochemical cells may be electrically connected in series. Some or all of such electrochemical cells may be electrically connected in parallel. In some implementations, oxygen gas may be fed to the anode region, which may be preferred when producing sulfur-containing product in a more oxidized form such as sulfur oxide gas, thiosulfate, sulfite and/or sulfate. Such oxygen gas may be supplied to the anode region in a purified oxygen gas stream, which may be made up mostly or even essentially all of oxygen gas. Such a purified oxygen gas stream may be provided from a variety of sources, for example oxygen separated from air or oxygen generated in a separate electrolysis operation. Oxygen supplied to an anode region may also be in an air stream.

When oxygen gas is supplied to the anode region, the oxygen gas may beneficially be supplied at a location in close proximity to the anode, to promote reaction of the oxygen at the anode. The oxygen gas may be supplied to the anode. The oxygen gas may be supplied by being bubbled through or sparged into liquid anolyte in the anode region. The oxygen gas may be supplied to the anode region through a gas diffusion membrane, which may be part of a gas diffusion electrode so that oxygen gas passing through the gas diffusion electrode comes into direct contact with an anode catalyst to promote efficient utilization of the oxygen gas.

The electrochemical processing may include conducting the electrochemical processing with electrical power applied between the anode and cathode of an electrochemical cell at a level sufficient to produce the sulfur-containing product in the anode region and the alkali metal hydroxide in the cathode region and not sufficient for water electrolysis that generates oxygen gas in the anode region. The electrochemical reactor may include multiple electrochemical cells producing sulfur-containing product and alkali metal hydroxide during electrochemical processing that is in the absence of, or essentially in the absence of, water electrolysis generating oxygen gas in the anode region of any of the electrochemical cells. During the electrochemical processing, electrical potential difference between the anode and the cathode of an electrochemical cell may be lower than 2.06 volts, no larger than 2.0 volts, no larger than 1.75 volts, no larger than 1.50 volts, no larger than 1.25 volts, no larger than 1.0 volt or no larger than 0.75 volt. Such electrical potential difference between anode and cathode may be at least 0.43 volt, at least 0.5 volt, at least 0.75 volt or at least 1.0 volt. Electrical power to the electrochemical reactor may be provided by a direct current power source.

The alkali metal-containing sulfide in the electrolyte solution feed may be essentially all alkali metal sulfide or essentially all alkali metal hydrosulfide. In some implementations, the alkali metal-containing sulfide includes both alkali metal sulfide and alkali metal hydrosulfide. In some preferred implementations, the electrolyte solution feed includes a molar concentration ratio of concentration of dissolved alkali metal sulfide to dissolved alkali metal hydrosulfide that is at least 1:99, 1:9, 1:3 or 1:2. Such a molar concentration ratio may be in a range having an upper limit of 99:1, 9:1, 3:1 or 2:1.

In some configurations, hydroxide ions produced at the cathode may mix with the alkali metal-containing sulfide electrolyte and drive the electrolyte solution equilibrium in the opposite direction of the hydrogen sulfide contact reaction. This would result in a more basic alkali metal solution, which may contain significant sodium sulfide, suitable for capture of $H_2S$ and/or $CO_2$.

During the electrochemical processing, alkali metal hydroxide may be made in a cathode region. An alkali metal hydroxide scrubbing reagent used in the scrubbing step may include at least a portion of such alkali metal hydroxide. When the scrubbing requires an initial hydroxide source at start-up or additional make-up alkali metal hydroxide from a source of fresh alkali metal hydroxide such fresh alkali metal hydroxide may be provided from separate processing including electrolyzing a second electrolyte solution comprising dissolved alkali metal salt (e.g., one or more of alkali metal sulfate, alkali metal bisulfate, alkali metal carbonate, alkali metal bicarbonate and combinations thereof) and wherein the electrolyzing comprises electrolyzing water of the second electrolyte solution, and generating fresh alkali metal hydroxide and in some cases dilute sulfuric acid or carbonic acid. An alkali metal hydroxide scrubbing reagent used in the scrubbing step may include at least a portion of such fresh alkali metal hydroxide. The sulfuric acid produced by such electrolyzing may be a dilute sulfuric acid. When processing includes preparing sulfuric acid from sulfur-containing feed comprising at least a portion of sulfur-containing product from the electrochemical processing, the method may include mixing at least a portion of the dilute sulfuric acid from the electrolyzing with concentrated sulfuric acid product made in the preparing sulfuric acid step, to prepare an intermediate-strength sulfuric acid solution having a sulfuric acid concentration between a concentration of sulfuric acid in the concentrated sulfuric acid product and a concentration of sulfuric acid in the dilute sulfuric acid. Such an intermediate-strength sulfuric acid solution may include, for example, from 33 to 50 percent (w/v) sulfuric acid, for example suitable for use as battery acid in many applications. Such electrolyzing of a second electrolyte solution to prepare fresh alkali metal hydroxide may also include generating oxygen gas product. Such oxygen gas product may be used to make up at least a portion of oxygen gas feed to an anode region during the electrochemical processing to produce sulfur-containing product.

In the case of the third aspect of the invention, the electrolyte solution feed to electrochemical processing may be derived from capturing hydrogen sulfide or from some other source. The sulfuric acid product may be a concentrated sulfuric acid (e.g., greater than 50 weight percent sulfuric acid).

Preparing sulfuric acid using sulfur-containing product from the electrochemical processing may involve exothermic processing, for example by the wet sulfuric acid process or the Contact Process, suitably modified to use feed including the sulfur-containing product from the electrochemical processing. Energy may be recovered from the exothermic processing, such as for example by producing steam. The recovered energy may be used to generate electricity, all or a portion of which may be used to provide electrical power to the electrochemical processing.

The electrolyte solution feed to the electrochemical processing may include dissolved alkali metal-containing carbonate, which may be selected from the group consisting of alkali metal carbonate, alkali metal-containing bicarbonate and combinations thereof. Such dissolved alkali metal carbonate may result from scrubbing a gas stream that comprises carbon dioxide in addition to hydrogen sulfide. When the electrolyte solution feed comprises dissolved alkali metal-containing carbonate, the method may include sequential electrochemical processing to prepare the sulfur-containing product. Processed electrolyte solution may be recovered from a first electrochemical processing, which electrolyte solution contains at least a portion of the alkali metal-containing carbonate and is depleted, preferably to a significant extent, in alkali metal-containing sulfide. Second electrochemical processing may then be performed, for example in a second electrochemical reactor, on a second electrolyte solution feed comprising at least a portion of the processed electrolyte solution from the first electrochemical processing, to prepare alkali metal hydroxide and carbon dioxide gas. The first electrochemical processing to produce the sulfur-containing product may be conducted at a direct current voltage that is below a voltage of which electrolysis of water in the electrolyte solution occurs (for example applying electrical power to a first electrochemical reactor to provide electrical potential difference across each electrochemical cell at any of the voltages described previously) and the second electrochemical processing may be conducted with application at electrical power to a second electrochemical reactor to provide electrical potential difference across each electrochemical cell of the second electrochemical reactor that is high enough to electrolyze water in the second electrolyte solution. The electrical potential difference, which may be supplied for example by a direct current voltage power source, across such an electrochemical cell for the second electrochemical processing may be at least 2.06 volts, at least 2.5 volts or at least 3.0 volts, or even higher voltages. The hydroxide generated from any of these relatively higher voltage water splitting processes may be used as the initial hydroxide source or as a make-up source.

When a gas stream to be scrubbed of hydrogen sulfide also includes carbon dioxide, the scrubbing may comprise selectively scrubbing hydrogen sulfide from the gas stream relative to carbon dioxide. Most of the hydrogen sulfide may be removed from the gas stream and captured in the hydroxide scrubbing reagent while most of the carbon dioxide may remain in the gas stream. After selectively scrubbing hydrogen sulfide from the gas stream, the scrubbing may include scrubbing some or all of the carbon dioxide remaining in the gas stream. The scrubbing of the carbon dioxide may be into a solution with hydroxide scrubbing reagent, similar to that used to scrub hydrogen sulfide but under conditions more conducive to capturing carbon dioxide, such as capturing carbon dioxide in the form of alkali metal-containing carbonate. Alternatively, the carbon dioxide scrubbing may be accomplished using a different scrubbing technique, for example amine scrubbing. Alternatively, the scrubbing may include scrubbing both the carbon dioxide and the hydrogen sulfide into a single hydroxide scrubbing solution, for example with the hydrogen sulfide reacting with the hydroxide to form alkali metal-containing sulfide and the carbon dioxide reacting with the hydroxide to form alkali metal-containing carbonate. Such a pregnant scrubbing solution comprising both alkali metal-containing sulfide and alkali metal-containing carbonate may be processed in a number of different ways. Such a pregnant scrubbing solution containing both dissolved alkali metal-containing sulfide and alkali metal-containing carbonate may be subjected to processing to selectively remove one component (e.g., selective removal of alkali metal-containing carbonate) relative to the other component (e.g., alkali metal-containing sulfide). Alternatively, such a pregnant scrubbing solution may be used as, or as part of, the electrolyte solution feed to the electrochemical processing.

These and other aspects and features of the invention are further described in the figure and in the description provided below.

BRIEF DESCRIPTION OF THE DRAWINGS

FIG. 1 shows a generalized process block flow diagram for some embodiments of the invention.

DETAILED DESCRIPTION

FIG. 1 depicts a simplified three-step input/output process block flow diagram applicable for some processing embodiments. In a first step (Step 1), gaseous feed containing acid gases including hydrogen sulfide ($H_2S$) are trapped by a wet sodium hydroxide scrubber. In some embodiments, the gaseous feed to Step 1 may be pure or essentially pure $H_2S$ in a concentrated stream. In other embodiments, the gaseous feed to Step 1 may include $H_2S$ as the major component of a mixed gas stream. In yet other embodiments, the gaseous feed to Step 1 may include $H_2S$ as a minor component of a mixed gas stream, which may be typical for example of natural gas. Therefore the concentration of $H_2S$ in gaseous feed to Step 1 may in some embodiments range for example from as high as 100% to as low as 1 ppm. The gas streams containing $H_2S$ may originate from an industrial source, such as flue gas, refinery operations or smelting, or from a natural source such as natural gas, petroleum gas or landfill gas. The scrubber may be any traditional wet scrubber design or may be a newer design wherein liquids and gases are contacted. For example, bubble columns, packed bed columns, sprayers or fluid film systems may be used in Step 1. A counter-current flow scrubber where the gas flows in the opposite direction to aqueous sodium hydroxide scrubbing solution may be preferred when scrubbing $H_2S$ from gas streams in which the $H_2S$ concentration is at or below 100 ppm.

The sodium hydroxide trapping reagent used in the Step 1 may be deployed as an aqueous solution or as wet pellets. An aqueous sodium hydroxide solution as a trapping reagent may range in concentration up to 50% by weight of sodium hydroxide, but preferably may be less than 20% by weight. Concentrations of sodium hydroxide below 20% in aqueous solutions favor production of NaHS in the trapping reaction and the electrochemical production of such dilute solutions is typically more energy efficient than the manufacture of more concentrated solutions. In another embodiment, the sodium hydroxide used to capture $H_2S$ may be made by electrochemical oxidation of NaHS, $Na_2S$, $Na_2CO_3$ or $NaHCO_3$. The amount of sodium hydroxide trapping reagent sourced by electrochemical regeneration of NaHS and/or $Na_2S$ may form all or a portion of sodium hydroxide supplied to the Step 1 for capturing $H_2S$, for example in a range of from 10% to nearly 100%, thereby permitting in some embodiments the creation of a nearly closed loop system.

A mixed gas feed to Step 1 may also include other acid gases besides $H_2S$. More specifically, carbon dioxide is often present in natural and industrial gas streams that contain $H_2S$, and may also be effectively scrubbed from a mixed gas stream by an aqueous sodium hydroxide trapping reagent to produce sodium-containing carbonate (e.g., sodium carbonate and/or sodium bicarbonate). Additionally, a mixed acid gas stream comprising both carbon dioxide and hydrogen sulfide may be scrubbed using the sodium hydroxide scrubbing reagent. Often at least a majority of one or both such acid gases ($H_2S$, $CO_2$) may be scrubbed by the sodium hydroxide scrubbing reagent. Up to 99% of one or both such acid gases may be scrubbed by the sodium hydroxide trapping reagent, and in some instances more than 99% of one or both of such acid gases may be scrubbed by the sodium hydroxide trapping reagent.

Acid gas trapping may be operated to selectively trap hydrogen sulfide rather than carbon dioxide, even in mixed gas streams containing a higher concentration of carbon dioxide than hydrogen sulfide. In some instances, the acid gas trapping process in Step 1 may be operated to kinetically favor hydrogen sulfide trapping by a factor of two or more relative to carbon dioxide trapping and conversion to sodium carbonate. In other instances, the acid gas trapping may be operated to kinetically favor hydrogen sulfide trapping and conversion to NaHS by a factor of five to ten, or more, relative to carbon dioxide trapping. Operating to preferentially capture hydrogen sulfide vs. carbon dioxide by the aqueous sodium hydroxide trapping reagent may be achieved by physical and/or chemical techniques. For example, physical techniques may involve contact of the gases with the liquid phase. More specifically, limiting the contact time favors preferential capture of hydrogen sulfide. Elevated temperatures above 80° C. and elevated pressure above 50 psi may be used to favor carbon dioxide. Other physical techniques may involve membrane systems, size exclusion systems and sorbent technologies. Chemical techniques may involve addition of other trapping reagents or catalysts including, but not limited to metals, metal oxides, metal sulfides, primary amines, secondary amines or tertiary amines, sulfhydryls and organo-metallic compounds. Such trapping reagents or catalysts may be dissolved or suspended within the aqueous sodium hydroxide trapping reagent or attached to a solid support. It is recognized that any combination of physical and or chemical techniques may be employed to promote preferential trapping of hydrogen sulfide over carbon dioxide or preferential trapping of carbon dioxide over hydrogen sulfide.

In certain embodiments, different acid gases may be selectively scrubbed in a stepwise process that preferentially removes one type of acid gas at a time. For example, a wet sodium hydroxide scrubber may be operated to selectively remove hydrogen sulfide first, and then a second scrubber may be used to remove carbon dioxide. The second scrubber may be a wet sodium hydroxide scrubber or other scrubbing systems, such as an amine scrubber. Alternatively, some low level some level of carbon dioxide may be allowed to remain in the gas stream provided the level is acceptably low for a resulting hydrocarbon gas product. A series of multiple contactors or a single linear contactor may be used wherein mixed acid gasses may enter the front of the series and fresh NaOH reagent may enter the back end of the series in a counter-current technique. Using a preferential $H_2S$ capture condition, such as discussed above, the front contactors may be enriched in sodium-containing sulfide (e.g., sodium sulfide and/or sodium hydrosulfide) and the back contactors may be enriched in sodium-containing carbonate (e.g., sodium carbonate and/or sodium bicarbonate). Some or all of the sodium-containing carbonate and/or sodium-containing sulfide may be selectively removed from the series of contactors. Ideally, relatively pure streams higher than 95% purity in the sodium-containing sulfide or sodium-containing carbonate, as the case may be would be collected. In some instances, sodium-containing carbonate may be allowed to migrate forward in the series of contactors. At some intermediate region between the front end of the contactor system enriched with sodium-containing sulfide, and the back contactors enriched with sodium-containing carbonate, the sodium-containing carbonate may be reacted with incoming $H_2S$, making sodium sulfide or sodium hydrosulfide and releasing $CO_2$, which may be recaptured as sodium carbonate or sodium bicarbonate further back in the series of contactors. At temperatures above 50° C., preferably above 80° C., carbon dioxide in the mixed acid gas may be prevented from significantly reacting with sodium carbonate to make sodium bicarbonate, thus assuring preferential trapping of $H_2S$ in forward contactors within the system.

In some instances, all of the sodium hydroxide fed to the Step 1 may be consumed by the $H_2S$ and or $CO_2$. However, in other instances only some of the sodium hydroxide is reacted, creating a mixture of sodium hydroxide, NaHS, $Na_2S$, sodium carbonate and/or sodium bicarbonate. The ratio of reagent (NaOH) to product (e.g., NaHS, etc.) plays an important role in reaction rates, as reactions often slow down as the reagent (here NaOH) is consumed. Therefore, the amount of unreacted NaOH may in some preferred implementations not be less than 10% (may be at least 10%) of the reagent feed to the Step 1, and in some implementations may be in a range of 20% to 50%.

Addition of an acid gas such as $H_2S$ and $CO_2$ to a strong base like NaOH and/or $Na_2S$ will tend to reduce the solution pH. At concentrations above 5%, sodium hydroxide solutions generally have a pH higher than 13. In contrast, NaHS solutions have a pH of about 11. Therefore, in some implementations it is possible to manipulate the $H_2S$ capture reaction by monitoring and controlling solution pH. In cases where it is desirable to convert all or essentially all of the NaOH to NaHS, the reaction may be conducted to reach a pH of about 11 or lower. In cases where it is desirable to convert only some of the NaOH to NaHS or to $Na_2S$, the reaction may be conducted to reach a pH between 11.5-12.5. With the fact that $pk_{a1}$ and $pk_{a2}$ for $H_2S$ are 7 and 12, respectively, at pH~12, NaHS will have about equal concentration to $Na_2S$. In the case when a very pure solution of NaHS is desired, the pH should preferably be about 9.5 or lower. Similarly, sodium carbonate has a pH near 11.6. Therefore, in cases where it is desirable to convert all of the NaOH to sodium carbonate, the reaction may be conducted to reach a pH of about 11.6. In cases where it is desirable to convert only some of the NaOH to sodium carbonate, the reaction may be conducted to reach a pH of about 12. In yet other cases where it is desirable to convert only some of the NaOH to a mixture of NaHS and sodium carbonate, the reaction may be conducted to reach a pH of about 12. By monitoring and manipulating the reaction using pH, the different desired ratios of NaOH reagent to NaHS and $Na_2S$ and/or sodium carbonate and sodium bicarbonate products may be achieved.

Referring to FIG. 1, in a second step (Step 2), NaHS or a mixture of NaHS and $Na_2S$ from Step 1 is fed into an electrochemical reactor where sodium hydroxide is regenerated and sulfur or sulfur dioxide is produced. Important to achieving an advantage of a high energy efficiency in some preferred implementations of this system is the low theoretical voltage of about 0.43 volts required to drive the reaction in Equation 1:

$$2NaHS+H_2O+5/2O_2 \rightarrow 2NaOH+2SO_2+H_2 \qquad \text{Eq. 1}$$

This allows the sodium hydroxide trapping reagent to be generated using significantly less energy than conventional chloralkali, electrodialysis or salt splitting technologies. These conventional technologies for the production of sodium hydroxide use about 2500 to 3000 kWh per ton of NaOH, whereas the NaHS conversion with processing of the invention may use up to 80% less energy. Production of sodium hydroxide from the NaHS or $Na_2S$ in this processing should generate about a ton of sodium hydroxide for less than 700 kWh, which is dramatically lower than existing manufacturing methods for NaOH. Even in the case where the initial hydroxide is generated by conventional technologies, recycling of the hydroxide through the system reduces the average energy cost per ton of alkali metal hydroxide used for scrubbing (including initial supply of hydroxide, regenerated hydroxide and added hydroxide to make up for system losses) to less than 2500 kWh per ton of alkali metal hydroxide, less than 2000 kWh per ton, less than 1500 kWh per ton or even less than 1000 kWh per ton. The very low voltage required to regenerate sodium hydroxide from NaHS in this processing also beneficially prevents the production of chlorine gas, even if some sodium chloride or other chloride salt impurities are present in this system. Careful operation of this process may therefore result in less than 1 kg of chlorine gas per ton of sodium hydroxide produced, and potentially less than 1 gram of chlorine may be generated per "dry ton" ton of NaOH produced, and without the need to use special feedstocks (e.g., special feed water) that have been cleaned of chloride impurities. When the initial hydroxide supply or added make-up hydroxide is sourced from chloralkali technology, roughly equal amounts of chlorine and sodium hydroxide are evolved during alkali metal hydroxide manufacture. In some implementations, initial supply of hydroxide and/or added make-up hydroxide may be generated from water electrolysis based technologies in order to result in generation of less than 1 kg of chlorine gas, less than 0.5 kg of chlorine gas, less than 0.1 kg of chlorine gas or less than 1 gram of chlorine gas per ton of alkali metal hydroxide produced, and particularly for sodium hydroxide. Such initial hydroxide supply and/or added make-up hydroxide may be manufactured off-site and transported to the site or may be manufactured on-site. Converting $Na_2S$ to NaOH also has a very low theoretical voltage and provides similar advantages.

Representative overall equations for some other reactions that may occur during electrochemical processing to generate sodium hydroxide include, for example:

$$NaHS+H_2O \rightarrow S+NaOH+H_2$$

where S may include elemental sulfur or polysulfide;

$$Na_2S+2H_2O \rightarrow S+2NaOH+H_2$$

where S may include elemental sulfur or polysulfide; and $$Na_2S+O_2+2H_2O \rightarrow SO_2+2NaOH+H_2$$

In some embodiments, sodium hydroxide may be electrochemically regenerated at or nearly at the same rate that it is consumed by trapping hydrogen sulfide, thereby maintaining a steady state concentration of NaOH and NaHS. In some instances, however, the steady state concentration of NaOH may be greater than the concentration of NaHS. Yet, in other instances, the steady state concentration of NaOH may be about the same as NaHS or may be less than the concentration of NaHS. In order to measure and beneficially manipulate these concentration ratios in real time, the pH of the solution may be monitored. A solution of sodium hydroxide as delivered to Step 1 may often have a pH of 13 or greater, whereas a solution of sodium hydrogen sulfide may have a pH of about 11 or lower. Therefore, depending on the concentration ratios, the steady state pH of the solution within both the acid gas scrubber and the electrochemical reactor may be maintained at a pH above pH 12.0, at about pH 12.0, or below pH 12.0.

When combining the acid gas trapping and electrochemical steps in a continuous process, significant benefits may be recognized by operation of both systems at some intermediate steady state concentration range of reagent (e.g., NaOH) and product (e.g., NaHS). The relative ratios of NaOH to $Na_2S$ and/or NaHS may vary, for example by 10%-20%, or some other range between Step 1 and Step 2. As an example, as reagent enters the acid gas trapping apparatus in Step 1, the ratio of NaOH to $Na_2S$ may be at least 60:40, and as it exits the acid gas trapping apparatus and is fed to the electrochemical reactor of Step 2 the ratio may be 40:60 or lower. In a continuous flow system, such a 40:60 or lower ratio solution leaving an acid gas contactor may enter the electrochemical reactor and then be regenerated back to the at least 60:40 ratio as it leaves the electrochemical reactor. Such a newly regenerated at least 60:40 NaOH to $Na_2S$ solution may then be recycled back to the acid gas contactor in Step 1.

In some instances, there is no need to isolate pure hydroxide for acid gas capture, a mixed solution comprising NaHS and $Na_2S$ or $Na_2S$ and NaOH are sufficient for hydrogen sulfide capture. In some embodiments, alkali metal hydroxide that is regenerated from an alkali metal-containing sulfide solution may actually be in the form of $Na_2S$, and may be referred to herein as basic alkali metal scrubbing, or capture, reagent even though the hydroxide may be in equilibrium as $Na_2S$ or other basic forms. Similarly, NaOH may be allowed to mix with sodium carbonate or sodium bicarbonate to form a more basic solution also referred herein as a basic alkali metal scrubbing, or capture, reagent.

In a similar manner, NaOH could be electrochemically regenerated from sodium carbonate and/or sodium bicarbonate, releasing concentrated carbon dioxide. As previously described, significant benefits may be recognized by operation of both acid gas scrubbing and electrochemical regeneration systems at some intermediate steady state concentration range of reagent and product. As another example, it is possible to operate the combined mixed acid gas and electrochemical regeneration process at an intermediate steady state concentration range between 30% to 70% of either reagent and product.

When hydrogen sulfide is the only acid gas being captured, the $H_2S$ trapping and sodium hydroxide regeneration via electrolysis of NaHS and/or $Na_2S$ may create a closed loop, or nearly closed loop. However, in some instances when hydrogen sulfide is not the only acid gas being captured, more sodium hydroxide will typically be consumed by the acid gas trapping than is regenerated by electrolysis of NaHS and/or $Na_2S$. For example, carbon dioxide is often present and it may be desirable to also trap carbon dioxide as sodium carbonate and/or sodium bicarbonate. In some embodiments, the sodium carbonate or bicarbonate may be removed from the system and additional sodium hydroxide must then be added from an external source. In other embodiments, sodium hydroxide may be regenerated electrochemically from sodium carbonate and/ or sodium bicarbonate and concentrated carbon dioxide may be released as a pure gas stream, potentially useful in oil and gas recovery operations or other markets. In yet other embodiments, electrochemical regeneration of sodium hydroxide from both sodium-containing sulfide and sodium-containing carbonate may create a closed loop, or nearly closed loop, system.

Alternatively, some or all of the additional make-up sodium hydroxide required for operation may be generated by the "New Sky Process", a process that captures and converts $CO_2$ and salt into useful carbonates, acids and other chemicals. Some implementations of the New Sky Process are described in U.S. Published Patent Application Nos. 2008/0245672 and 2008/0245660, U.S. Pat. No. 8,227,127 and International Patent Publication Nos. WO2008/124538 and WO2012/129510; the contents of each of which is incorporated herein by reference as if set forth herein in full. The New Sky Process typically uses aqueous solutions containing sodium sulfate and/or sodium bisulfate as an electrolyte feed to electrochemically produce oxygen and dilute sulfuric acid in an anode region and hydrogen and sodium hydroxide in a cathode region. Such oxygen may be used in the electrochemical regeneration of sodium hydroxide from NaHS or $NA_2S$, for example as shown in Equation 1 and other equations presented above. Furthermore, the sulfuric acid may be used in the production of concentrated sulfuric acid via the wet sulfuric acid (WSA) process, for example by using such dilute sulfuric acid as feed or a portion of the feed to the hydration step for WSA processing.

In an alternative processing, the concentrated sulfuric acid generated by either the WSA process or the Contact Process could be mixed with the dilute sulfuric acid from the New Sky Process to generate battery acid, for example containing about 33% to 50% w/vol sulfuric acid.

The New Sky Process may be used to generate the balance of sodium hydroxide consumed by trapping carbon dioxide (e.g., Step 1 of FIG. 1). In other embodiments, sodium hydroxide generated from electrolysis of NaCl, for example via the chloralkali process or a non-chlorine generating processes, could be used to make up the balance of sodium hydroxide consumed by the trapping of carbon dioxide and recovery of the carbonate as a sequestered form of $CO_2$. In a preferred implementation, however, the New Sky process is used to provide make-up sodium hydroxide, because unlike the chloralkali process, the New Sky process may be operated with no or essentially no chlorine production.

In some embodiments, when carbon dioxide is being captured in the hydroxide scrubbing reagent (e.g., Step 1), sodium carbonate and/or sodium bicarbonate may be precipitated from a solution of NaHS and/or $Na_2S$ by chilling. Sodium carbonate may be precipitated as the decahydrate salt, which is sensitive to the common ion effect in the presence of other dissolved sodium salts. In one embodiment, sodium carbonate and/or sodium bicarbonate is precipitated from a 5% or greater concentrated solution of NaHS and/or $Na_2S$ upon chilling to a temperature of about 5° C. or lower. For example, essentially all of the sodium carbonate and/or sodium bicarbonate may be removed when NaHS concentration is greater than 5% and the temperature is reduced to about 0° C. or lower. The resulting NaHS solution may then be processed in an electrochemical reactor (e.g., Step 2) to regenerate sodium hydroxide.

In other embodiments, a mixed solution containing sodium-containing sulfide and sodium-containing carbonate may be subjected to electrochemical regeneration at a voltage high enough to convert NaHS and/or $Na_2S$ to NaOH, but below a voltage necessary to electrolyze water and release CO₂ from sodium carbonate. Such processing may be used in successive cycles to raise the concentration of sodium carbonate with each cycle to high concentrations that facilitate effective isolation and recovery of sodium carbonate and/or sodium bicarbonate. In a similar manner, sodium-containing carbonate may be precipitated by chilling in the presence of sodium hydroxide once most or all of the sodium-containing sulfide has been selectively regenerated to NaOH, which also aids in the precipitation of sodium carbonate via the common ion effect, and chilling temperatures may be as previously described using the common ion effect of NaHS and/or Na₂S. The theoretical voltage potential to regenerate sodium hydroxide from sodium carbonate is about four times higher than the theoretical voltage to regenerate NaOH from NaHS or Na₂S. Therefore, in some embodiments, acid gas scrubbing by sodium hydroxide is manipulated to preferentially capture H₂S, and once a majority, or substantially all, of the H₂S is removed from the acid gas stream, then CO₂ may be removed, by amine scrubbing or hydroxide scrubbing for example, and processed separately from the captured H₂S. For example the CO₂ may then be scrubbed into an amine scrubbing solution and then stripped from the solution to prepare a gaseous product concentrated in CO₂

Mixed solutions of sodium-containing sulfide and sodium-containing carbonate may be subjected to two electrochemical steps at different voltages. The first electrochemical step may be based for example on equation 1, which consumes NaHS and produces NaOH. The second electrochemical step may be based on water electrolysis, which produces protons and oxygen gas at the anode. The proton generated at the anode may react with sodium carbonate in the anolyte to release carbon dioxide. The sodium ions from the anolyte may pass through a diaphragm or cation selective membrane to the catholyte where hydroxyl ions and hydrogen gas are generated at the cathode, thus producing sodium hydroxide. Equation 2 shows the sum of the equations wherein sodium carbonate and water are consumed and sodium hydroxide, carbon dioxide, oxygen and hydrogen are produced. The released carbon dioxide may be further reacted to produce sodium bicarbonate.

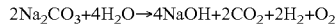

$$2Na_2CO_3 + 4H_2O \rightarrow 4NaOH + 2CO_2 + 2H_2 + O_2 \quad \text{Eq. 2}$$

The theoretical minimal voltage required to initiate Equation 1 is about 0.43 volts whereas the theoretical minimal voltage required to initiate Equation 2 is about 2.06 volts. Thus, two successive electrochemical processes may be used to regenerate sodium hydroxide from a mixed electrolyte comprising sodium carbonate and/or sodium bicarbonate and Na₂S and/or NaHS by first applying a voltage less than 2.06 volts, followed by applying a voltage greater than 2.06 volts. The released CO₂ may be in the form of a concentrated gas stream, useful for many purposes. In some instances, the concentrated carbon dioxide electrochemically released from sodium carbonate may be used to produce sodium bicarbonate from sodium carbonate. In other instances, the concentrated carbon dioxide electrochemically released from sodium carbonate may be used for enhanced oil recovery. In yet other instances, concentrated carbon dioxide electrochemically released from sodium carbonate may be sold or used as supercritical carbon dioxide, dry ice or a concentrated reagent for industrial purposes.

At process start-up, an initial supply of basic alkali metal scrubbing reagent (e.g., sodium hydroxide, sodium sulfide) will be required. Ideally all basic alkali metal scrubbing reagent may be regenerated, but in practice there will be losses that occur during operation, including through bleed of the system as needed. Some or all of an initial supply of basic alkali metal scrubbing reagent (e.g., sodium hydroxide, sodium sulfide) and/or additional make-up basic alkali metal scrubbing reagent to compensate for system losses during operation (including system losses due to system bleed) may be delivered to site or manufactured on site. Some or all of an initial supply of alkali metal hydroxide and/or additional make-up alkali metal hydroxide may be made on site by electrochemical processing of sodium-containing sulfide feed brought to the site. For example, fresh alkali metal-containing sulfide feed (e.g., sodium sulfide and/or sodium hydrosulfide) may be brought to the site and processed by electrochemical processing to provide an initial source of alkali metal hydroxide. Likewise, to provide some or all make-up hydroxide to compensate for system losses, such fresh alkali metal-containing sulfide may be brought to the site and added to the process at an appropriate point to compensate for lost alkali metal hydroxide, for example by addition of the fresh alkali metal-containing sulfide to scrubbing solution feed to the scrubbing operation or to the electrolyte feed to electrochemical processing, resulting in generation of additional alkali metal hydroxide during the electrochemical processing. Likewise, when an operation includes electrochemical processing of alkali metal-containing carbonate to prepare alkali metal hydroxide, fresh alkali metal-containing carbonate may be subjected to the electrochemical processing to prepare some or all of an initial supply of alkali metal hydroxide or may be added at an appropriate point in the process (e.g., addition to scrubbing solution feed to scrubbing or to electrolyte feed to electrochemical processing) to compensate for all or some alkali metal hydroxide losses in the system.

The electrochemical cell of an electrochemical reactor for the regeneration of sodium hydroxide may be a two-chamber electrochemical cell wherein the anode and cathode are separated by an ion selective membrane or non-gas permeable diaphragm. An oxidant (typically oxygen or air, although the invention is not limited to these choices) if desired may be supplied to the anode region, preferably at or in very close proximity to the anode. In an alternative embodiment, where the production of mixed gases (including hydrogen), is acceptable, a single chamber reactor may be used. In some instances, a gas diffusion anode may be used to provide oxygen gas or air of the anode. For enhanced performance, the anode electrode should be stable and catalytically active in the presence of water and NaHS, Na₂S or H₂S. For regeneration of sodium hydroxide from sodium carbonate, well-known oxygen evolving electrodes used for water splitting are appropriate for the cell. However, standard oxygen evolving electrodes are not necessarily of high compatibility with NaHS and subsequent products and byproducts due to possible sulfur poisoning. Therefore, sulfur-tolerant anode catalysts and/or coatings may be preferred for NaHS or Na₂S electrolysis. Formulations comprising molybdenum (Mo), tungsten (W), iron (Fe), ruthenium (Ru), nickel (Ni), cobalt (Co) and or copper (Cu) may be used. Some preferred anode catalyst materials may include, disulfides of molybdenum (MoS₂) and/or tungsten (WS₂). In one embodiment, MoS₂ may be deposited on an electrode surface as triangular or pseudo-triangular nanoparticles. The nanoparticles may range in diameter, for example, from 5 nm to 20 nm and may comprise a single tri-layer of S—Mo—S. The sulfide exposure on the Mo step edge may beneficially be about 50%. The MoS₂ may be deposited onto graphite or with an excess of graphite particles to generate a two phase planar architecture. A graphite/

$MoS_2$ formulation may be deposited onto a solid, porous, gas diffusion or mesh electrode. Graphite/$MoS_2$ islands may be formed, for example ranging in diameter from 5 to 20 microns and which may have an average diameter of perhaps about 10 microns. Multiple depositions and optional annealing at temperatures about 200° C. or greater may be applied to achieve full coverage of the electrode surface by graphite/$MoS_2$ islands with high densities of active sites. In some instances, 50% or greater coverage of $MoS_2$ nanoparticles on the island surface may be achieved. $WS_2$ based electrodes and electrode coating may be prepared in a similar manner as described for $MoS_2$. Other anode formulations include spinel-type sulfide catalysts with the general chemical formula of $AB_2X_4$, wherein A and B are two different transition metal cations, including, but not limited to Fe, Co, Ni, and Cu, and X is either sulfur or oxygen. In some instances, when applying a voltage that is lower than the minimal voltage required to split water, simple anodes comprising nickel or stainless steel may be used. These materials may operate in a "poisoned" state resulting in lower current densities, but sufficient to drive the desired reaction in an economic manner.

In the process of electrochemically regenerating sodium hydroxide from NaHS and/or $Na_2S$, sulfur, polysulfide or sulfur dioxide ($SO_2$) may be released. Other trapping strategies for $H_2S$ such as amine scrubbers may release gaseous $H_2S$ in a stripping operation following $H_2S$ capture. Such concentrated $H_2S$ must be further processed, which has traditionally been accomplished by the Claus process or similar variations to produce elemental sulfur and some $SO_2$. However, in some embodiments including processing according to the invention such a concentrated $H_2S$ stream may be subjected to capture using a sodium hydroxide scrubbing reagent or other basic alkali metal scrubbing reagent (e.g., Step 1 of FIG. 1) and then subjected to electrochemical processing (e.g., Step 2 of FIG. 2) to generate elemental sulfur, polysulfide and/or $SO_2$, as an alternative to the Claus process.

Referring again to FIG. 1, a third processing step (Step 3) may involve production of sulfuric acid from elemental sulfur, polysulfide and/or from sulfur oxide gas, with $SO_2$ and/or $SO_3$ being more preferred. Several techniques may be used for this step, such as the Contact Process and the wet sulfuric acid process. Each of those processes is exothermic and in traditional processing the source sulfur may be from either elemental sulfur or $H_2S$. In traditional processing, oxygen combustion of sulfur or $H_2S$ produces $SO_2$. Sulfur-containing product from electrochemical processing (e.g., Step 2) may be used in such a first step. However, in some preferred embodiments $SO_2$ generated electrochemically (e.g., Step 2) may be used as a source of $SO_2$ for modified wet sulfuric acid processing or modified Contact Process processing to generate sulfuric acid from $SO_2$ that is electrochemically generated from NaHS or $Na_2S$ rather than produced by a combustion reaction.

Both the Contact Process and wet sulfuric acid process are exothermic. The wet sulfuric acid process generates significant heat in the hydration of $SO_3$. The excess heat can be used to generate high quality superheated steam for electrical power generation. The theoretical energy-generating potential of sulfuric acid production may be more than sufficient to drive the electrochemical regeneration of NaOH from NaHS or $Na_2S$. In some instances, there may be sufficient excess energy to also drive chilling via absorption chilling or to drive New Sky Process electrochemistry to generate additional sodium hydroxide. Thus, in some embodiments, some of the energy needed to run the electrochemical system may be generated from electricity generated from waste heat produced during sulfuric acid production; and in some embodiments most or all of the electrical energy needed to run the integrated system may be generated from sulfuric acid production.

In cases where nearly all the energy is generated from electricity generated from sulfuric acid production and any carbon dioxide is converted to sodium carbonate or bicarbonate, the overall process may be carbon negative, consuming more $CO_2$ than is produced by the process cycle. The overall process may also be carbon negative in cases where more carbon dioxide is sequestered in sodium carbonate and bicarbonate generated in the system than is released in the generation of any supplemental energy required to run the process.

The processing shown in FIG. 1 is for purposes of illustration of some exemplary embodiments when it is desired to extend processing to manufacture of sulfuric acid. It should be appreciated that in other embodiments, sulfur, sulfur dioxide and/or other sulfur-containing products may be used for other purposes or sold as commodity products. Processing shown in FIG. 1 is general in nature. Additional processing may be performed before step 1, between steps 1 and 2, between steps 2 and 3 and/or after step 3. For example, intermediate processing between steps 1 and 2 or between 2 and 3 may include conditioning or adjusting properties of process streams or adding components to or removing components from process streams, or otherwise preparing feed for the next process step.

The description has been presented with reference to sodium as an alkali metal in the processing of FIG. 1, but the sodium in any of the referenced materials containing sodium may be replaced with another alkali metal, for example potassium. The description has also been presented with primary reference to basic alkali metal scrubbing, or capture, reagent including alkali metal hydroxide as a main alkali metal base used as a hydrogen sulfide capture agent, but the same processing principles described apply also to basic alkali metal scrubbing reagent including, or even based primarily on, alkali metal sulfide as an alkali metal base used as a hydrogen sulfide capture agent in the basic alkali metal scrubbing reagent.

The foregoing discussion of the invention and different aspects thereof has been presented for purposes of illustration and description. The foregoing is not intended to limit the invention to only the form or forms specifically disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Although the description of the invention has included description of one or more possible embodiments and implementations and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, any feature described or claimed with respect to any disclosed implementation may be combined in any combination with one or more of any other features of any other implementation or implementations, to the extent that the features are not necessarily technically compatible, and all such combinations are within the scope of the present invention.

The terms "comprising", "containing", "including" and "having", and grammatical variations of those terms, are intended to be inclusive and nonlimiting in that the use of such terms indicates the presence of some condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or the appropriate grammatical variation of such narrower terms). For example, the a statement that something "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all.

What is claimed is:

1. A method for processing hydrogen sulfide and preparing sulfur-containing products, the method comprising:
    scrubbing hydrogen sulfide from a gas stream comprising hydrogen sulfide, the scrubbing comprising contacting the gas stream in a first reactor with basic alkali metal scrubbing reagent to form alkali metal-containing sulfide;
    electrochemical processing an electrolyte solution feed comprising at least a portion of the alkali metal-containing sulfide to produce sulfur-containing product;
    the electrochemical processing comprising:
        feeding at least a portion of the electrolyte solution feed to a second reactor, wherein the second reactor is an electrochemical reactor including at least one electrochemical cell comprising an anode, a cathode, an anode region adjacent the anode and a cathode region adjacent the cathode;
        producing the sulfur-containing product in the anode region;
        producing alkali metal hydroxide in the cathode region; and
        applying electrical power between the anode and cathode at a level sufficient to produce the sulfur-containing product in the anode region and the alkali metal hydroxide in the cathode region and not sufficient for water electrolysis that generates oxygen gas in the anode region; and
    wherein the electrochemical processing is in the absence of adding oxygen gas to each said electrochemical cell;
    wherein the electrolyte solution feed comprises dissolved alkali metal-containing carbonate; and
    the method further comprises:
        recovering processed electrolyte solution from the electrochemical processing, the processed electrolyte solution comprising at least a portion of the alkali metal-containing carbonate and being depleted in the alkali metal containing sulfide relative to the electrolyte solution feed; and
        second electrochemical processing a second electrolyte solution feed comprising at least a portion of the processed electrolyte solution, to prepare alkali metal hydroxide and carbon dioxide gas, the second electrochemical processing being conducted in a second electrochemical reactor at a direct current voltage high enough to electrolyze water in an anode region of the second electrochemical reactor.

2. A method according to claim 1, wherein the electrolyte solution feed comprises a molar concentration ratio of concentration of dissolved alkali metal sulfide to concentration of dissolved alkali metal hydrosulfide of at least 1:9.

3. A method according to claim 1, wherein the gas stream comprises a mixture including hydrogen sulfide and carbon dioxide and the scrubbing comprises selectively scrubbing hydrogen sulfide from the gas stream relative to carbon dioxide.

4. A method according to claim 3, wherein the scrubbing comprises scrubbing at least a portion of the carbon dioxide from the gas stream in the form of alkali metal containing carbonate.

5. A method according to claim 1, wherein the alkali metal-containing sulfide comprises a mixture of alkali metal sulfide and alkali metal hydrosulfide.

6. A method according to claim 1, wherein during the electrochemical processing, electrical potential difference between the anode and the cathode of the electrochemical cell is smaller than 2.06 volts.

7. A method according to claim 1, wherein the electrochemical reactor comprises multiple said electrochemical cells producing sulfur containing product and alkali metal hydroxide during the electrochemical processing and the electrochemical processing is essentially in the absence of water electrolysis generating oxygen gas in the anode region of any of said electrochemical cells.

8. A method according to claim 7, wherein at least some of said electrochemical cells are electrically connected in series.

9. A method according to claim 1, wherein the sulfur containing product comprises at least one member selected from the group consisting of elemental sulfur and polysulfide.

10. A method according to claim 1, comprising:
    making fresh alkali metal hydroxide, separate from the electrochemical processing, the making fresh alkali metal hydroxide comprising:
    electrolyzing a second electrolyte solution comprising dissolved alkali metal salt selected from the group consisting of alkali metal sulfate, alkali metal bisulfate and combinations thereof; and the electrolyzing comprises electrolyzing water of the second electrolyte solution to generate the fresh alkali metal hydroxide and dilute sulfuric acid;

wherein, the scrubbing reagent comprises at least a portion of the fresh alkali metal hydroxide.

11. A method according to claim 1, wherein the alkali metal is sodium.

12. A method according to claim 1, wherein the alkali metal-containing sulfide is selected from the group consisting of alkali metal sulfide, alkali metal hydrosulfide and combinations thereof.

13. A method according to claim 1, wherein during the electrochemical processing, electrical potential difference between the anode and the cathode of the electrochemical cell is no larger than 2.0 volts.

14. A method according to claim 1, comprising producing hydrogen gas in the cathode region.

15. A method according to claim 14, wherein the electrochemical reactor comprises multiple said electrochemical cells producing sulfur-containing product, alkali metal hydroxide and hydrogen gas during the electrochemical processing and the electrochemical processing is essentially in the absence of water electrolysis generating oxygen gas in the anode region of any of said electrochemical cells.

16. A method for processing hydrogen sulfide and preparing sulfur-containing products, the method comprising;
scrubbing hydrogen sulfide from a gas stream comprising hydrogen sulfide, the scrubbing comprising contacting the gas stream with basic alkali metal scrubbing reagent to form alkali metal-containing sulfide;
electrochemical processing an electrolyte solution feed comprising at least a portion of the alkali metal-containing sulfide to produce sulfur-containing product;
the electrochemical processing comprising:
feeding at least a portion of the electrolyte solution feed to an electrochemical reactor including at least one electrochemical cell comprising an anode, a cathode, an anode region adjacent the anode and a cathode region adjacent the cathode;
producing the sulfur-containing product in the anode region;
producing alkali metal hydroxide in the cathode region;
applying electrical power between the anode and cathode at a level sufficient to produce the sulfur-containing product in the anode region and the alkali metal hydroxide in the cathode region and not sufficient for water electrolysis that generates oxygen gas in the anode region; and
feeding oxygen gas to the anode region.

17. A method according to claim 16, wherein the alkali metal-containing sulfide comprises a mixture of alkali metal sulfide and alkali metal hydrosulfide.

18. A method according to claim 16, wherein during the electrochemical processing, electrical potential difference between the anode and the cathode of the electrochemical cell is smaller than 2.06 volts.

19. A method according to claim 16, wherein the electrochemical reactor comprises multiple said electrochemical cells producing sulfur containing product and alkali metal hydroxide during the electrochemical processing and the electrochemical processing is essentially in the absence of water electrolysis generating oxygen gas in the anode region of any of said electrochemical cells.

20. A method according to claim 16, wherein the sulfur containing product comprises at least one member selected from the group consisting of elemental sulfur and polysulfide.

21. A method according to claim 16, comprising:
making fresh alkali metal hydroxide, separate from the electrochemical processing, the making fresh alkali metal hydroxide comprising:
electrolyzing a second electrolyte solution comprising dissolved alkali metal salt selected from the group consisting of alkali metal sulfate, alkali metal bisulfate and combinations thereof; and the electrolyzing comprises electrolyzing water of the second electrolyte solution to generate the fresh alkali metal hydroxide and dilute sulfuric acid;
wherein, the scrubbing reagent comprises at least a portion of the fresh alkali metal hydroxide.

22. A method according to claim 16, wherein the alkali metal is sodium.

23. A method according to claim 16, wherein the alkali metal-containing sulfide is selected from the group consisting of alkali metal sulfide, alkali metal hydrosulfide and combinations thereof.

24. A method according to claim 16, wherein during the electrochemical processing, electrical potential difference between the anode and the cathode of the electrochemical cell is no larger than 2.0 volts.

25. A method according to claim 16, comprising producing hydrogen gas in the cathode region.

26. A method according to claim 25, wherein the electrochemical reactor comprises multiple said electrochemical cells producing sulfur-containing product, alkali metal hydroxide and hydrogen gas during the electrochemical processing and the electrochemical processing is essentially in the absence of water electrolysis generating oxygen gas in the anode region of any of said electrochemical cells.

27. A method for processing hydrogen sulfide and preparing sulfur-containing products, the method comprising:
scrubbing hydrogen sulfide from a gas stream comprising hydrogen sulfide, the scrubbing comprising contacting the gas stream in a first reactor with basic alkali metal scrubbing reagent to form alkali metal-containing sulfide;
electrochemical processing an electrolyte solution feed comprising at least a portion of the alkali metal-containing sulfide to produce sulfur-containing product;
the electrochemical processing comprising:
feeding at least a portion of the electrolyte solution feed to a second reactor, wherein the second reactor is an electrochemical reactor including at least one electrochemical cell comprising an anode, a cathode, an anode region adjacent the anode and a cathode region adjacent the cathode;
producing the sulfur-containing product in the anode region;
producing alkali metal hydroxide in the cathode region; and
applying electrical power between the anode and cathode at a level sufficient to produce the sulfur-containing product in the anode region and the alkali metal hydroxide in the cathode region and not sufficient for water electrolysis that generates oxygen gas in the anode region; and
wherein the electrochemical processing is in the absence of adding oxygen gas to each said electrochemical cell;

wherein the gas stream comprises a mixture including hydrogen sulfide and carbon dioxide and the scrubbing comprises selectively scrubbing hydrogen sulfide from the gas stream relative to carbon dioxide;

wherein the scrubbing comprises scrubbing at least a portion of the carbon dioxide from the gas stream in the form of alkali metal containing carbonate;

the scrubbing comprises recovering a pregnant scrubbing solution comprising the alkali metal-containing sulfide and the alkali metal-containing carbonate; and the method comprises prior to the electrochemical processing, selectively removing by precipitation at least a portion of the alkali metal-containing carbonate from the pregnant scrubbing solution relative to the alkali metal-containing sulfide.

28. A method according to claim 27, wherein the metal alkali-containing carbonate is selected from the group consisting of alkali metal carbonate, alkali metal bicarbonate and combinations thereof.

29. A method according to claim 27, wherein the alkali metal-containing sulfide comprises a mixture of alkali metal sulfide and alkali metal hydrosulfide.

30. A method according to claim 27, wherein during the electrochemical processing, electrical potential difference between the anode and the cathode of the electrochemical cell is smaller than 2.06 volts.

31. A method according to claim 27, wherein the electrochemical reactor comprises multiple said electrochemical cells producing sulfur containing product and alkali metal hydroxide during the electrochemical processing and the electrochemical processing is essentially in the absence of water electrolysis generating oxygen gas in the anode region of any of said electrochemical cells.

32. A method according to claim 27, wherein the sulfur containing product comprises at least one member selected from the group consisting of elemental sulfur and polysulfide.

33. A method according to claim 27, comprising:

making fresh alkali metal hydroxide, separate from the electrochemical processing, the making fresh alkali metal hydroxide comprising:

electrolyzing a second electrolyte solution comprising dissolved alkali metal salt selected from the group consisting of alkali metal sulfate, alkali metal bisulfate and combinations thereof; and the electrolyzing comprises electrolyzing water of the second electrolyte solution to generate the fresh alkali metal hydroxide and dilute sulfuric acid;

wherein, the scrubbing reagent comprises at least a portion of the fresh alkali metal hydroxide.

34. A method according to claim 27, wherein the alkali metal is sodium.

35. A method according to claim 27, wherein the alkali metal-containing sulfide is selected from the group consisting of alkali metal sulfide, alkali metal hydrosulfide and combinations thereof.

36. A method according to claim 27, wherein during the electrochemical processing, electrical potential difference between the anode and the cathode of the electrochemical cell is no larger than 2.0 volts.

37. A method according to claim 27, comprising producing hydrogen gas in the cathode region.

38. A method according to claim 37, wherein the electrochemical reactor comprises multiple said electrochemical cells producing sulfur-containing product, alkali metal hydroxide and hydrogen gas during the electrochemical processing and the electrochemical processing is essentially in the absence of water electrolysis generating oxygen gas in the anode region of any of said electrochemical cells.

* * * * *